US012444877B2

(12) United States Patent
Sugiyama et al.

(10) Patent No.: US 12,444,877 B2
(45) Date of Patent: Oct. 14, 2025

(54) CONNECTION DIRECTION CONVERSION CONNECTOR AND WIRE HARNESS

(71) Applicant: Yazaki Corporation, Tokyo (JP)

(72) Inventors: Daisuke Sugiyama, Makinohara (JP); Masanobu Higashitani, Makinohara (JP); Tomoaki Hayakawa, Makinohara (JP); Yasukazu Chikamatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 335 days.

(21) Appl. No.: 18/446,561

(22) Filed: Aug. 9, 2023

(65) Prior Publication Data

US 2024/0088604 A1 Mar. 14, 2024

(30) Foreign Application Priority Data

Sep. 14, 2022 (JP) ................................ 2022-146218

(51) Int. Cl.
*H01R 13/52* (2006.01)
*H01R 13/405* (2006.01)
*H01R 13/6592* (2011.01)

(52) U.S. Cl.
CPC ....... *H01R 13/5219* (2013.01); *H01R 13/405* (2013.01); *H01R 13/5216* (2013.01); *H01R 13/6592* (2013.01)

(58) Field of Classification Search
CPC .............. H01R 13/5219; H01R 13/405; H01R 13/5216; H01R 13/6592
See application file for complete search history.

(56) References Cited

U.S. PATENT DOCUMENTS

2011/0250789 A1* 10/2011 Burris .................... H01R 24/40 439/578
2022/0239030 A1* 7/2022 Kudo ....................... H01R 4/58

FOREIGN PATENT DOCUMENTS

JP 2015-092441 A 5/2015

* cited by examiner

*Primary Examiner* — Sean Gugger
(74) *Attorney, Agent, or Firm* — Sughrue Mion, PLLC

(57) ABSTRACT

An attachment member 12 of a connection direction converting connector **1*a* includes a frame-shaped second seal member 124 configured to seal between: a frame-shaped housing-side opposing surface 122*a*-6 of the attachment housing 122 that surrounds the accommodation portion that contains a connection portion between an attachment terminal 121 and a connector terminal 112 and faces the shell 123; and a frame-shaped shell-side opposing surface 123*k* of the shell 123 that faces the housing-side opposing surface 122*a*-6**.

10 Claims, 7 Drawing Sheets

CONNECTION DIRECTION CONVERSION CONNECTOR AND WIRE HARNESS

TECHNICAL FIELD

The present invention relates to a connection direction converting connector that makes connector connection while changing the connection direction, and to a wire harness provided with such a connection direction converting connector at the end.

BACKGROUND

Conventionally, a connection direction converting connector that makes connector connection by changing the connection direction to a desired direction is known as a connector used for connector connection in places where mounting space is limited (for example, see Patent Document 1). The connection direction converting connector described in Patent Document 1 is provided at the end of the wire harness and makes connector connection with a connection-target device by changing the connection direction 90 degrees with respect to the extension direction of the electric wire. In this connection direction converting connector, a seal member is attached to a fixation surface that is to be fixed to the connection target. When the connection direction converting connector is fixed to the connection target, the seal member is sandwiched between the fixation surface and the outer surface of the connection target to makes tight sealing.

RELATED ART

Patent Document

[Patent Document 1] JP 2015-92441 A

SUMMARY OF THE INVENTION

Problem to be Solved by the Invention

In this case, with the above-described connection direction converting connector, the seal member is exposed before the connection direction converting connector is fixed to the connection target, and the seal member in the exposed state may be damaged at this stage. Therefore, such a connection direction converting connector must be handled with great care so as not to damage the seal member at the stage prior to fixation to the connection target, and such handling may be a burden on workers.

Accordingly, the present invention focuses on the above-described problems, and it is an object of the present invention to provide a connection direction converting connector that alleviates damage to the seal member in the stage prior to fixation, and to provide a wire harness provided with such a connection direction converting connector at the end.

Solution to Problem

In order to solve the above-described problem, a connection direction converting connector includes: a body connector; and an attachment member to which the body connector is connected in a first connection direction, and to which a connection target is connected in a second connection direction that crosses the first connection direction, so that the attachment member relays connection of the body connector to the connection target, wherein the attachment member includes: an attachment terminal formed in a bent shape including a first portion extending in the first connection direction and a second portion extending in the second connection direction, the first portion being connected to a connector terminal of the body connector, the second portion being connected to a terminal portion of the connection target; an attachment housing containing a connection portion where the first portion and the connector terminal are connected to each other, and holding the attachment terminal such that the second portion protrudes; a shell formed in a bottomed tubular shape, the shell containing, through an opening, at least an accommodation portion of the attachment housing for containing the connection portion so as to allow the second portion to be connected to the terminal portion, the body connector being connected to a surrounding wall of the shell, the connection target being fixed to a side of the shell formed the opening; and a frame-shaped seal member configured to seal between: a frame-shaped housing-side opposing surface of the attachment housing that surrounds the accommodation portion and faces the shell; and a frame-shaped shell-side opposing surface of the shell that faces the housing-side opposing surface.

Furthermore, in order to solve the above-described problem, a wire harness includes the connection direction converting connector; and an electric wire having the connector terminal at an end, and extending from the body connector.

Advantageous Effects of the Invention

According to the above-described connection direction converting connector and wire harness, damage to the seal member in the stage prior to fixation can be alleviated.

DETAILED DESCRIPTION OF THE EXEMPLARY EMBODIMENT

Hereinafter, one embodiment of a connection direction converting connector and a wire harness is explained.

Figure 1:
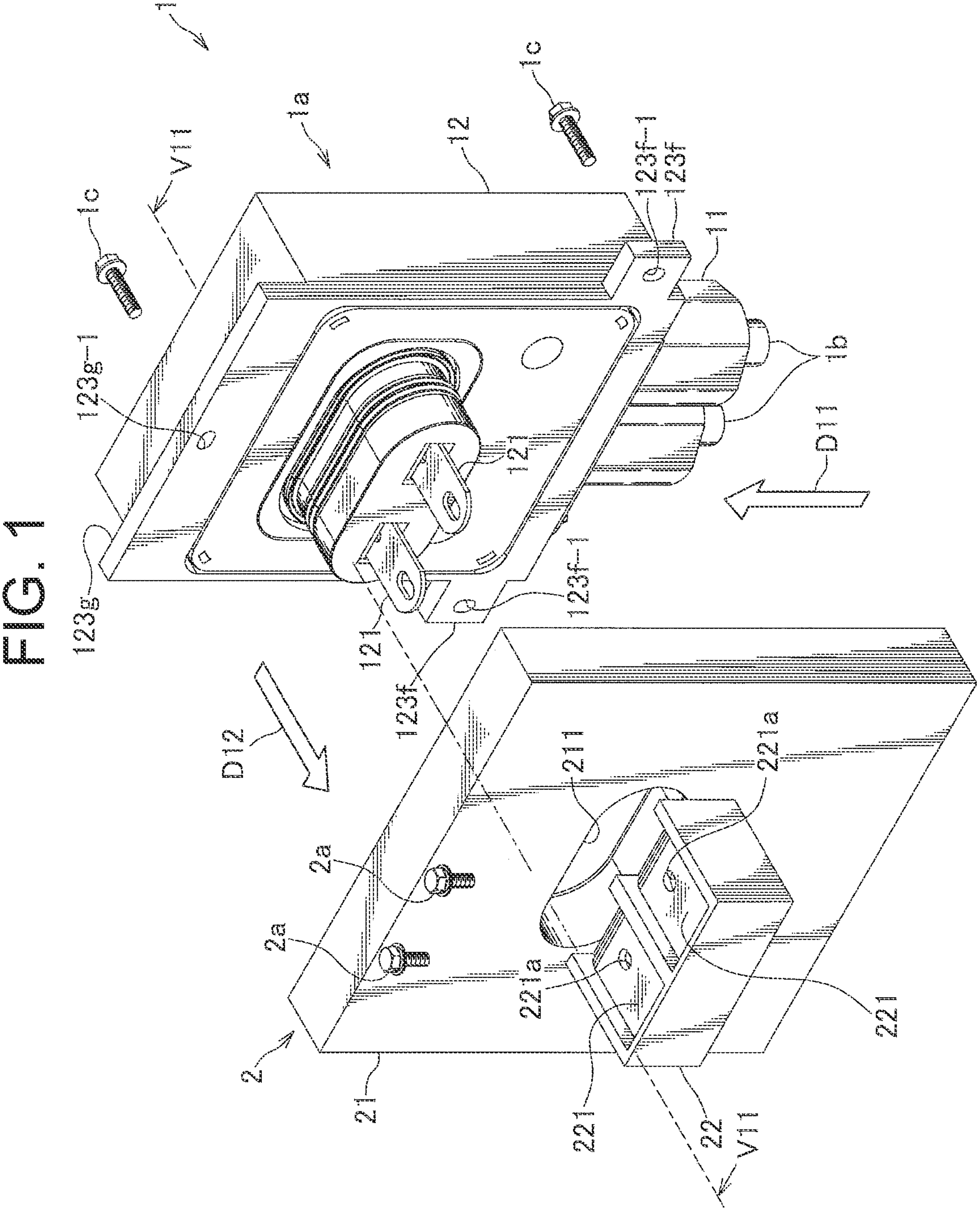
FIG. 1 is a perspective view illustrating a connection direction converting connector and a wire harness according to one embodiment, as well as a schematic connection target.

FIG. 1 is a perspective view illustrating a connection direction converting connector and a wire harness according to one embodiment, as well as a schematic connection target.

Figure 2:
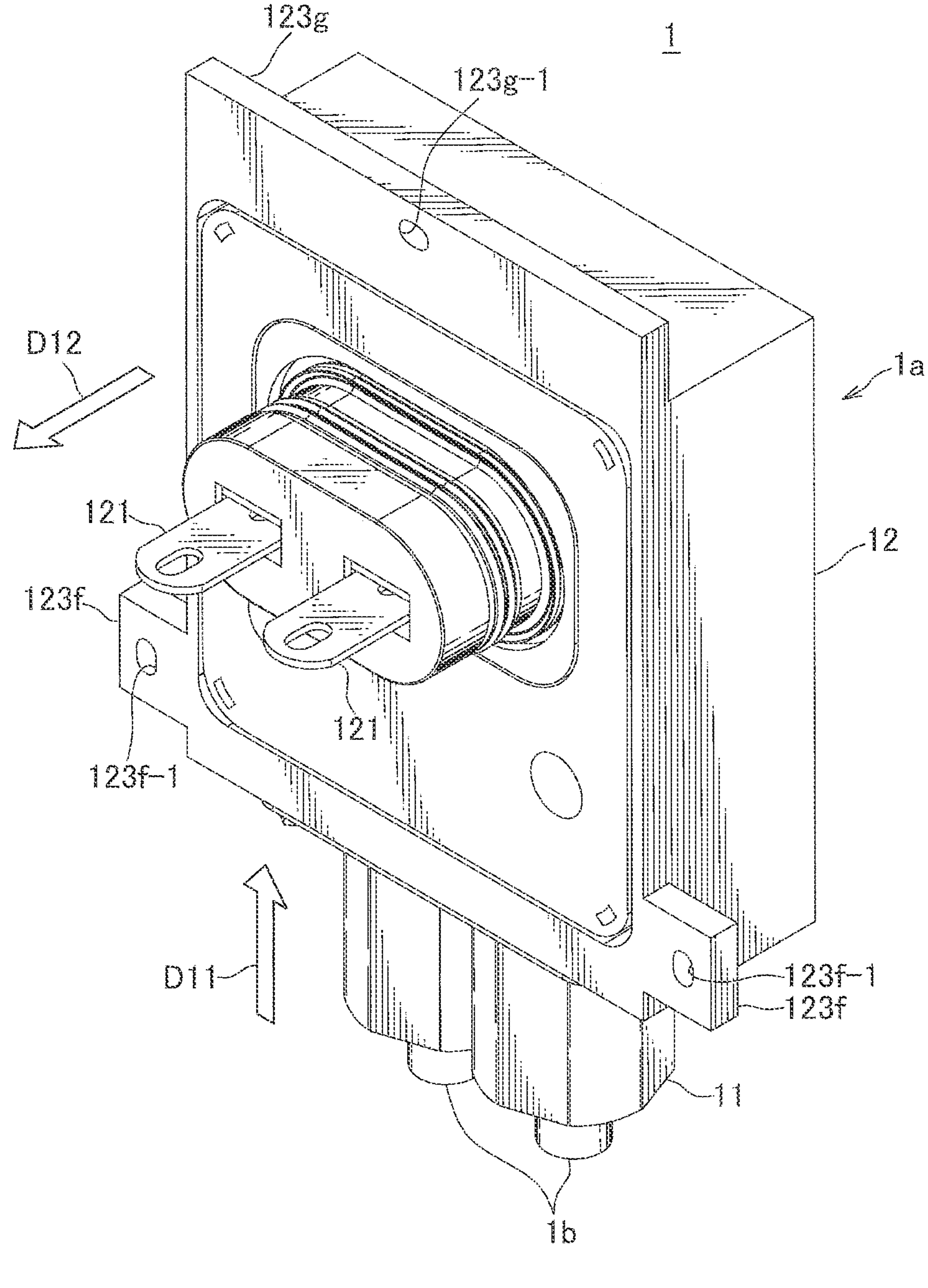
FIG. 2 is a perspective view illustrating the connection direction converting connector and the wire harness as illustrated in FIG. 1, without the connection target.

FIG. 2 is a perspective view illustrating the connection direction converting connector and the wire harness as illustrated in FIG. 1, without the connection target.

The wire harness 1 as illustrated in FIG. 1 and FIG. 2 is provided in an automobile and the like, and includes a connection direction converting connector 1*a* at the end of two electric wires 1*b*. FIG. 1 illustrates, as a connection target for the connection direction converting connector 1*a*, a device 2 containing a terminal portion 22 to be connected to the connection direction converting connector 1*a* as well as a functional portion in a metal case 21. With respect to the case 21, only one wall surface to which the connection direction converting connector 1*a* is attached is illustrated.

The connection direction converting connector 1*a* is an L-shaped connector including: a body connector 11 that is a straight connector with two terminals; and an attachment member 12 connecting to the terminal portion 22 of the device 2, i.e., the connection target, with two terminals by changing the connection direction 90 degrees. The attachment member 12 is connected such that the body connector 11 is connected in a first connection direction D11, and the attachment member 12 is connected to the device 2 in a second connection direction D12 perpendicular to the first connection direction D11. The attachment member 12 is a member for relaying connection of the body connector 11 to the device 2 through these connections.

From the attachment member 12, two attachment terminals 121 connected to two connector terminals of the body connector 11 in the attachment member 12 protrude in the second connection direction D12. When the attachment member 12 is fixed to an outer wall surface of the case 21 of the device 2 with three bolts 1*c*, the two attachment terminals 121 enter the inside of the device 2 through an entry hole 211 provided in the case 21. The two attachment terminals 121 are fastened with two bolts 2*a* to two terminals 221 of the terminal portion 22 in the device 2, so that the body connector 11 is connected to the device 2 via the attachment member 12.

Figure 3:
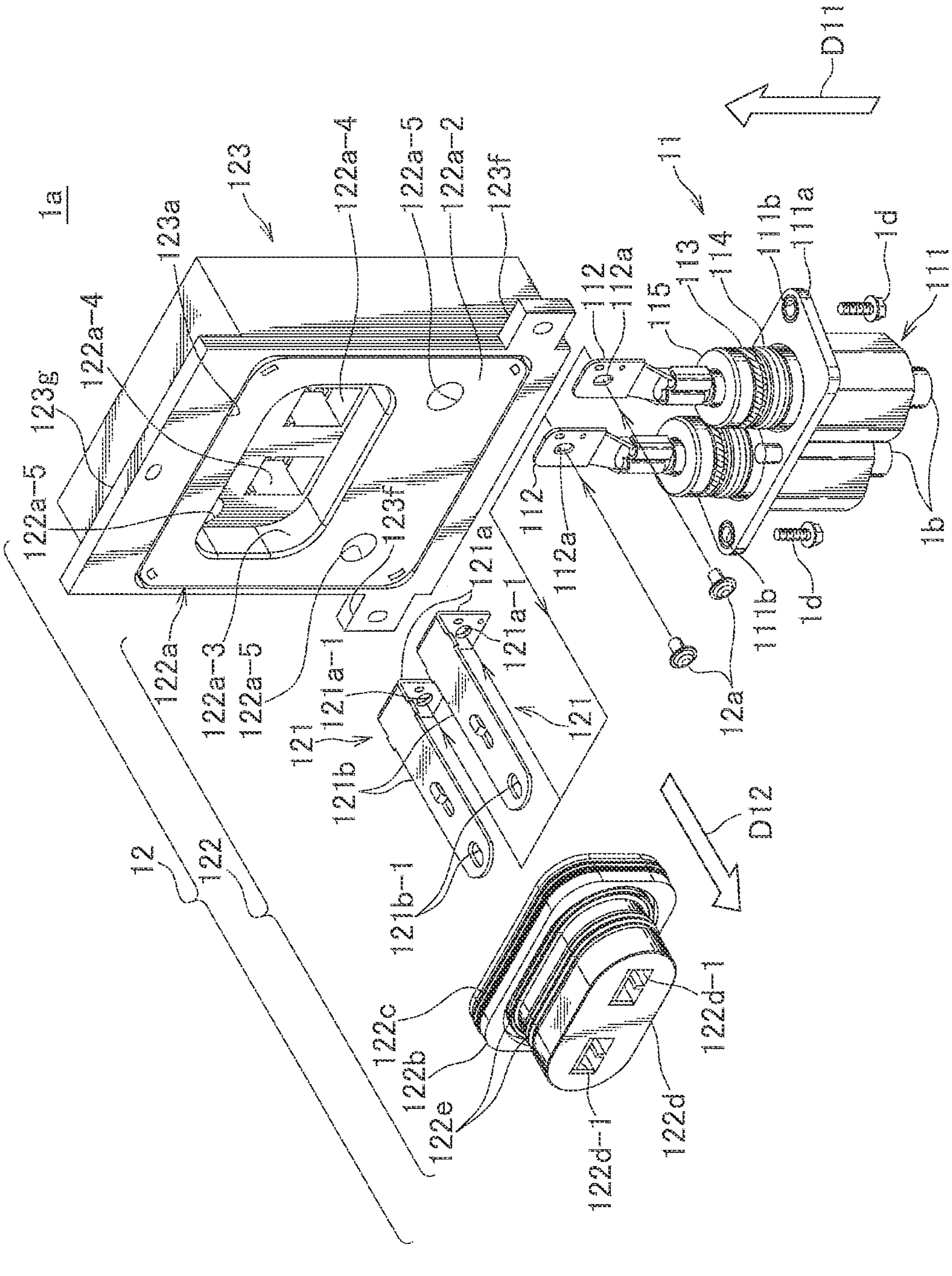
FIG. 3 is an exploded perspective view illustrating a connection direction converting connector as illustrated in FIG. 1 and FIG. 2.
Figure 4:
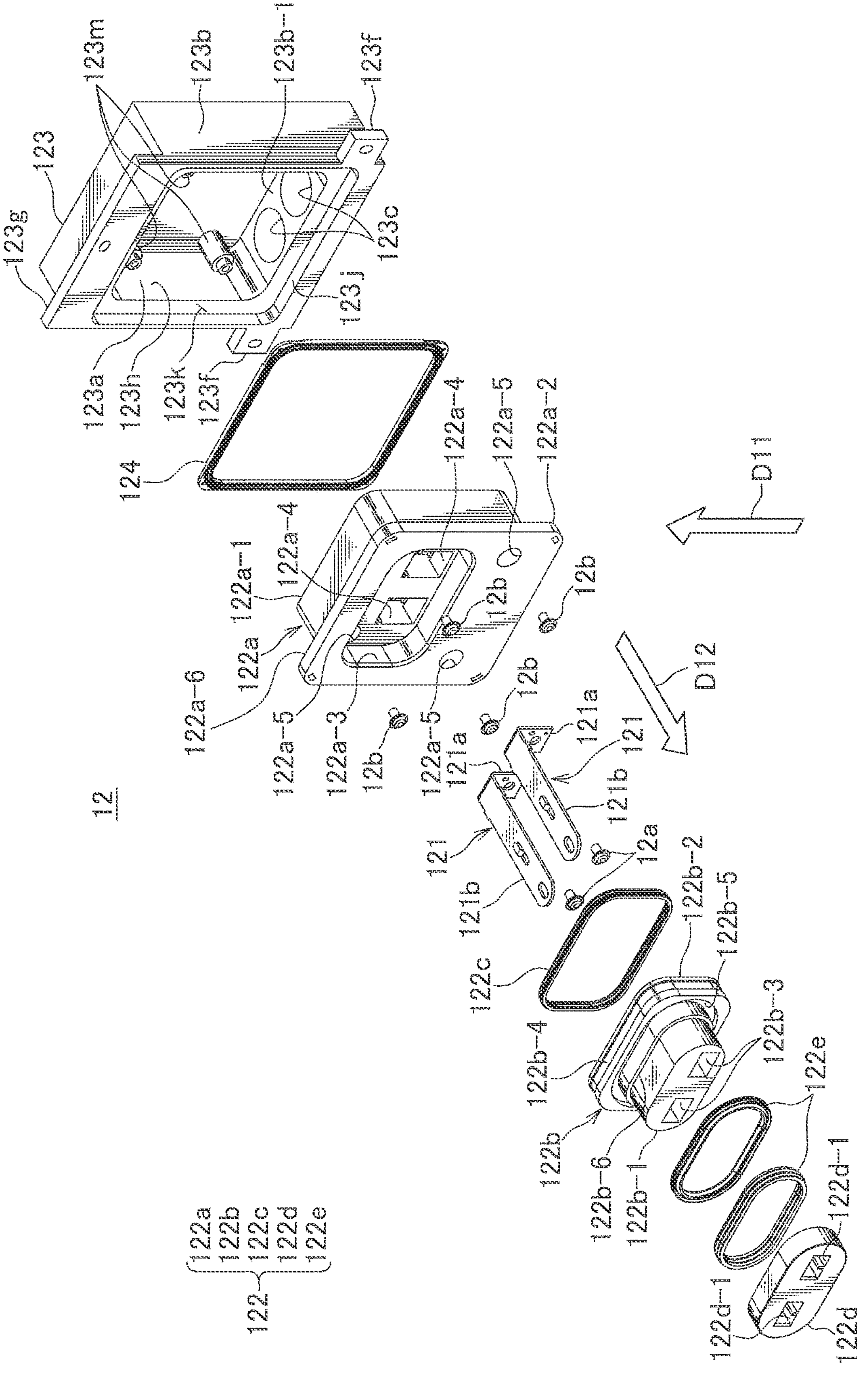
FIG. 4 is an exploded perspective view illustrating an attachment member as illustrated in FIG. 1 to FIG. 3.

FIG. 3 is an exploded perspective view illustrating a connection direction converting connector as illustrated in FIG. 1 and FIG. 2. FIG. 4 is an exploded perspective view illustrating an attachment member as illustrated in FIG. 1 to FIG. 3.

The body connector 11 of the connection direction converting connector 1*a* according to the present embodiment has such a structure that the two electric wires 1*b* are inserted through an electric wire holding member 111 made of resin in a double cylindrical shape, and a connector terminal 112 is connected to the end of each electric wire 1*b*. In this case, in the present embodiment, the electric wire 1*b* extending from the body connector 11 is a shielded electric wire electromagnetically shielded by a braid. At the end of each electric wire 1*b*, the core electric wire is exposed at the tip of the electric wire holding member 111, and the connector terminal 112 is crimped and connected. Also, a shield terminal 113 is connected to the braid at a position slightly away from the connector terminal 112 toward the electric wire holding member 111. The shield terminal 113 is a member for grounding the braid of electric wire 1*b* to metal case 21, i.e., the ground of the connection target side.

Furthermore, the body connector 11 includes a pair of support members 115 for supporting the shield terminal 113 of each electric wire 1*b* such that the shield terminal 113 is sandwiched, in a direction in which the electric wire 1*b* extends, between the support member 115 and a first seal member 114. The shield terminal 113 is a metal cylinder, and is crimped and connected to the braid in the inside of the first seal member 114, with the end on the side of the connector terminal 112 being exposed and sandwiched between the first seal member 114 and the support member 115. The first seal member 114 is a rubber seal serving as a cylindrical seal member made of a flexible resin such as rubber, and a part of the first seal member 114 is located inside the electric wire holding member 111 to seal between the inner surface of the electric wire holding member 111 and the electric wire 1*b*.

The electric wire holding member 111 is provided with an attachment flange 111*a* in a rectangular plate shape for attaching the body connector 11 to the attachment member 12 on the side of the connector terminal 112. A pair of attachment holes 111*b* is provided at the diagonal positions of this attachment flange 111*a*. As illustrated in FIG. 3, the body connector 11 is fixed to the attachment member 12 with two bolts 1*d* penetrating the pair of attachment holes 111*b* of the attachment flange 111*a*.

As described above, the attachment member 12 is a member for relaying the connection of the body connector 11 to the device 2, i.e., the connection target, while changing the connection direction from the first connection direction D11 to the second connection direction D12. As illustrated in FIG. 3 and FIG. 4, this attachment member 12 includes two attachment terminals 121, an attachment housing 122, a shell 123, and a second seal member 124.

The attachment terminals 121 are busbars for connecting the connector terminals 112 of the body connector 11 to the two terminals 221 of the terminal portion 22 of the device 2. The attachment terminal 121 is formed in a L-shaped bent shape including a first portion 121*a* extending in the first connection direction D11 and a second portion 121*b* in the second connection direction D12. The first portion 121*a* is connected to the connector terminal 112 of the body connector 11. The connector terminal 112 is formed with a through hole, i.e., a bolt hole 112*a*. On the other hand, a female screw hole 121*a*-1 is formed in the first portion 121*a* of the attachment terminal 121. As illustrated in FIG. 3, the connector terminal 112 is laid on the first portion 121*a* from the inside of the L shape of the attachment terminal 121. The connector terminal 112 is fastened to the first portion 121*a* when the bolt 12*a* penetrates the bolt hole 112*a* and screwed into the female screw hole 121*a*-1. The second portion 121*b* of the attachment terminal 121 is connected to the terminal 221 of the terminal portion 22 of the device 2. A through hole, i.e., a bolt hole 121*b*-1, is formed in the second portion 121*b*, and a female screw hole 221*a* (FIG. 1) is formed in the terminal 221 of the terminal portion 22. The second portion 121*b* is fastened to the terminal 221 when the second portion 121*b* is laid on the surface of the terminal 221 and the bolt 2*a* penetrates the bolt hole 121*b*-1 to be screwed into the female screw hole 221*a*.

The attachment housing 122 contains the connection portions between the first portions 121*a* and the connector terminals 112, and holds the attachment terminals 121 such that the second portion 121*b* protrudes. This attachment housing 122 includes a shell-side housing 122*a*, a device-side housing 122*b*, a third seal member 122*c*, a front member 122*d*, and two fourth seal members 122*e*.

The shell-side housing 122*a* is a resin housing that contains the connection portions between the first portions 121*a* and the connector terminals 112 and that is contained in the shell 123. The shell-side housing 122*a* has such a shape that a rectangular plate portion 122*a*-2, fitting into the entrance side of the shell 123, is laid on and integrated with a rectangular block portion 122*a*-1, accommodated on the bottom side of the shell 123. This shell-side housing 122*a* is provided with an installation recessed portion 122*a*-3 in a rectangular shape in which the device-side housing 122*b* is accommodated and installed as explained later. Furthermore, on the bottom surface of the installation recessed portion 122*a*-3, two terminal containing chambers 122*a*-4, in which the connection portions between the first portions 121*a* and the connector terminals 112 are contained, are provided as recessed portions in a rectangular shape recessed from the bottom surface of the installation recessed portion 122*a*-3. In the terminal containing chambers 122*a*-4, the connector terminals 112 penetrating the side walls of the shell 123 and the shell-side housing 122*a* are inserted, and the first portions 121*a* are inserted through the openings of the terminal containing chambers 122*a*-4. Then, in the terminal containing chambers 122*a*-4, the above-described fastening is made with the bolts 12*a*, so that the connection portions between the first portions 121*a* and the connector terminals 112 are contained in the terminal containing chambers 122*a*-4. The shell-side housing 122*a* is provided with bolt holes 122*a*-5, i.e., through holes, at four locations, for fixing the shell-side housing 122*a* to the shell 123. The shell-side housing 122*a* is fastened to the shell 123 with four bolts 12*b* that penetrate the bolt holes 122*a*-5 at four locations.

The device-side housing 122*b* is penetrated by the second portions 121*b* of the attachment terminal 121, and is a resin housing that is installed in the shell-side housing 122*a* and that protrudes in the second connection direction D12. The device-side housing 122*b* has a shape obtained by integrating a device-side portion 122*b*-1 in a long cylindrical and a proximal-end portion 122*b*-2 in a rectangular plate shape. The device-side portion 122*b*-1 is a portion that holds the second portion 121*b* and protrudes toward the device 2. The proximal-end portion 122*b*-2 is a portion that protrudes in a flange manner from the device-side portion 122*b*-1 on a side of the device-side portion 122*b*-1 that is opposite to the protruding side of the second portion 121*b*-1. The proximal-end portion 122*b*-2 allows the first portion 121*a* of the attachment terminal 121 to be exposed toward the shell-side housing 122*a*. The device-side housing 122*b* is provided with a pair of device insertion holes 122*b*-3 into which the second portions 121*b* are inserted toward the device 2 from the proximal-end portion 122*b*-2 to the device-side portion 122*b*-1. The device-side housing 122*b* is installed in the shell-side housing 122*a* such that the proximal-end portion 122*b*-2 is accommodated in the installation recessed portion 122*a*-3 with the second portions 121*b* being inserted into the device insertion holes 122*b*-3. With the second portion 121*b* protruding, the device-side portion 122*b*-1 as well as the front member 122*d* explained later enter the inside of the device 2 from the entry hole 211 provided in the case 21 (FIG. 1).

The third seal member 122*c* seals between the shell-side housing 122*a* and the device-side housing 122*b*. Specifically, the third seal member 122*c* is a rubber seal serving as a frame-shaped seal member that is interposed to seal between the outer periphery of the proximal-end portion 122*b*-2 of the device-side housing 122*b* and the inner periphery of the installation recessed portion 122*a*-3 of the shell-side housing 122*a*. An attachment groove 122*b*-4 for the third seal member 122*c* is provided on the entire outer periphery of the proximal-end portion 122*b*-2 of the device-side housing 122*b*.

The front member 122*d* is a resin cap that covers the tip of the device-side portion 122*b*-1 of the device-side housing 122*b*. This front member 122*d* is formed with a pair of terminal windows 122*d*-1 that are in communication with the device insertion holes 122*b*-3 of the device-side housing 122*b* to allow the second portions 121*b* of the attachment terminal 121 to protrude.

Two fourth seal members 122*e* are provided, which are frame-shaped rubber seals that seal between: the device-side portion 122*b*-1 of the device-side housing 122*b* that enters the entry hole 211 of the case 21 of the device 2; and the entry hole 211. One of the fourth seal members 122*e* is installed to the border portion between the device-side portion 122*b*-1 and the proximal-end portion 122*b*-2, and is sandwiched between the border portion and the inner peripheral edge on the outer side of the entry hole 211 to seal therebetween. An attachment groove 122*b*-5 for the fourth seal member 122*e* is provided on the entire periphery of the border portion between the device-side portion 122*b*-1 and the proximal-end portion 122*b*-2. Another of the fourth seal members 122*e* is sandwiched between the middle portion of the device-side portion 122*b*-1 and the inner surface of the middle portion of the entry hole 211 to seal therebetween. A holding step 122*b*-6 for holding the fourth seal member 122*e* between the front member 122*d* and the holding step 122*b*-6 is provided on the entire periphery of the middle portion of the device-side portion 122*b*-1.

The attachment housing 122 configured by each component explained above holds the attachment terminals 121 connected to the connector terminals 112, and the shell-side housing 122*a* is contained in the shell 123.

The shell 123 is formed in bottomed rectangular tubular shape, and contains the shell-side housing 122*a* of the attachment housing 122 through the opening 123*a* such that the second portions 121*b* of the attachment terminal 121 is connectable to the terminal portion 22 of the device 2. In the attachment housing 122, the shell-side housing 122*a* serves as an accommodation portion for the connection portion between the connector terminal 112 and the first portion 121*a* of the attachment terminal 121. In other words, the shell 123 is a portion for containing the accommodation portion of the attachment housing 122. On the other hand, the device-side portion 122*b*-1 of the device-side housing 122*b* of the attachment housing 122 as well as the front member 122*d* at the tip of the device-side portion 122*b*-1 and the two second portions 121*b* protrude from the opening 123*a* of the shell 123 to be exposed. One wall surface 123*b*-1 of the four wall surfaces constituting the surrounding wall 123*b* of the shell 123 is provided with two through holes 123*c* which are penetrated by the two connector terminals 112. A gap between the inner circumferences of the through holes 123*c* and the body connector 11 is sealed by the first seal members 114 provided adjacently to the connector terminals 112. The wall surface 123*b*-1, in which the through holes 123*c* are provided, is provided with two female screw holes into which two bolts 1*d* (FIG. 3) for fixing the body connector 11 is screwed. The other three wall surfaces of the surrounding wall 123*b* are provided with a pair of tongue pieces 123*f* and one rib flange 123*g*, for fixing bolts, near the edge of the opening 123*a*. As illustrated in FIG. 1, the tongue pieces 123*f* and the rib flange 123*g* are used to fix the connection direction converting connector 1*a* to the case 21 of the device 2. That is, when three bolts 1*c* penetrating bolt holes 123*f*-1 of the tongue pieces 123*f* and a bolt hole 123*g*-1 of the rib flange 123*g* are screwed into three female screw holes provided in the case 21, the case 21 is fastened to the connection direction converting connector 1*a*.

A deep-bottom recessed portion 123*h* in a rectangular shape in which the rectangular block portion 122*a*-1 of the shell-side housing 122*a* fits and a shallow-bottom recessed portion 123*j* in which the rectangular plate portion 122*a*-2 fits are formed on the inside of the shell 123. The border portion between the deep-bottom recessed portion 123*h* and the shallow-bottom recessed portion 123*j* is a step surface that faces the portion near the edge of the rectangular plate portion 122*a*-2. Four stepped bosses 123*m* for receiving screws, the details of which are explained later, are erected on the bottom surface of the deep-bottom recessed portion 123*h*. As illustrated in FIG. 4, the shell-side housing 122*a* accommodated in the deep-bottom recessed portion 123*h* and the shallow-bottom recessed portion 123*j* is fastened to the shell 123, when four bolts 12*b* penetrating the bolt holes 122*a*-5 at four locations are screwed into the female screw holes of the stepped bosses 123*m*.

The second seal member 124 seals between the shell 123 and the attachment housing 122. This second seal member 124 is a rubber seal serving as a rectangular frame-shaped seal member that is sandwiched between a portion near the edge of the rectangular plate portion 122*a*-2 of the shell-side housing 122*a* of the attachment housing 122 and the stepped surface of the shell 123. The second seal member 124 seals between the shell 123 and the attachment housing 122 when the second seal member 124 is sandwiched and crushed between these two surfaces. The fixation structure between the attachment housing 122 and the shell 123 with the second seal member 124 interposed therebetween will be described later in detail with reference to another drawing.

Also, the shell 123 is formed of a conductive member such as metal to electromagnetically shield the connection portion between the first portions 121*a* of the attachment terminal 121 and the connector terminal 112 of the body connector 11. Furthermore, the shield terminal 113 is connected on the side inner than the sealing by the first seal member 114, and the metal case 21 of the device 2 is attached, so that the shell 123 relays the grounding of the braid to the case 21.

Next, the fixation structure between the attachment housing 122 and the shell 123 with the second seal member 124 interposed therebetween will be explained.

Figure 5:
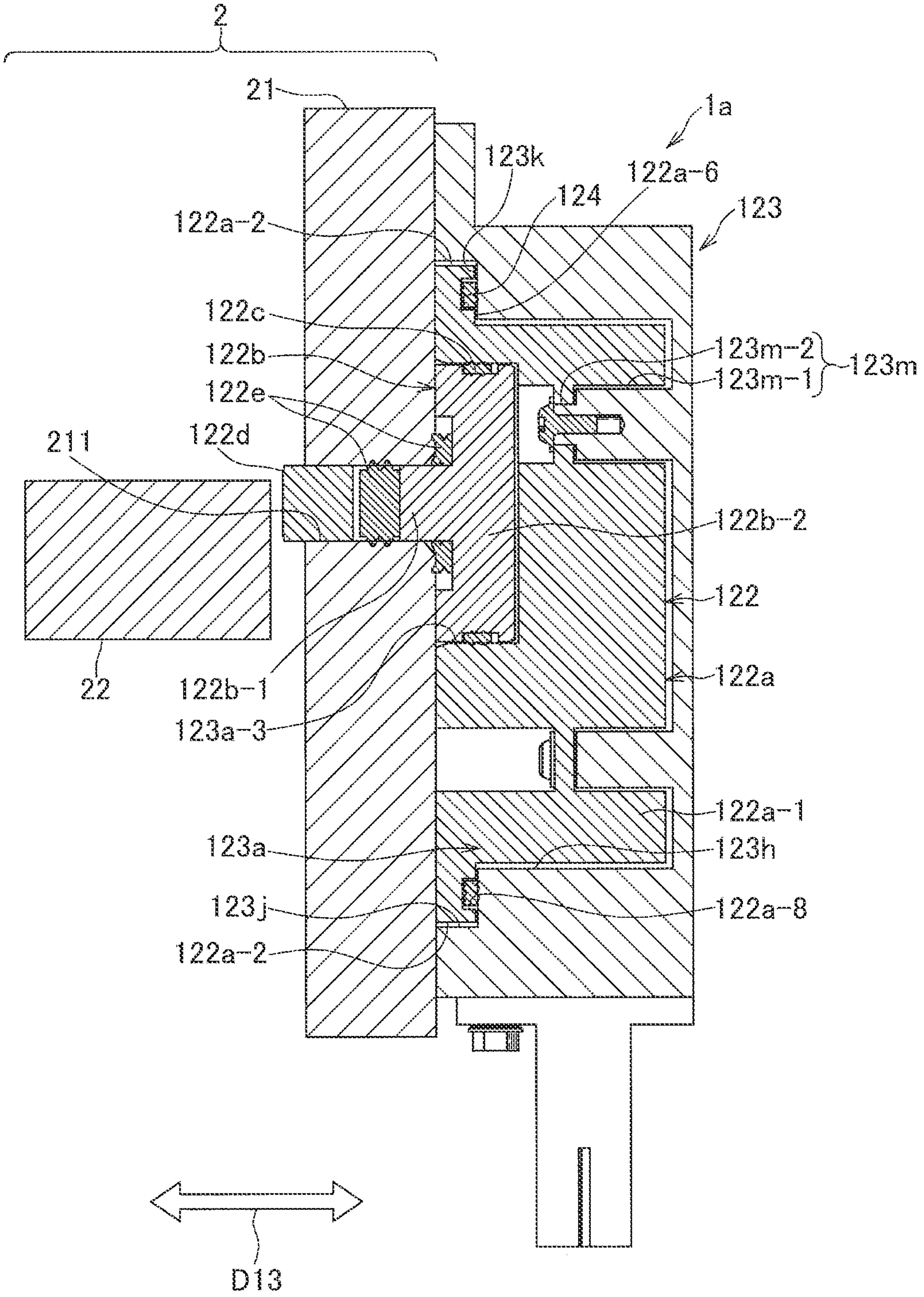
FIG. 5 is cross-sectional view, taken along line V11-V11 of FIG. 1, illustrating a fixation structure of an attachment housing and a shell with a second seal member interposed therebetween.
Figure 6:
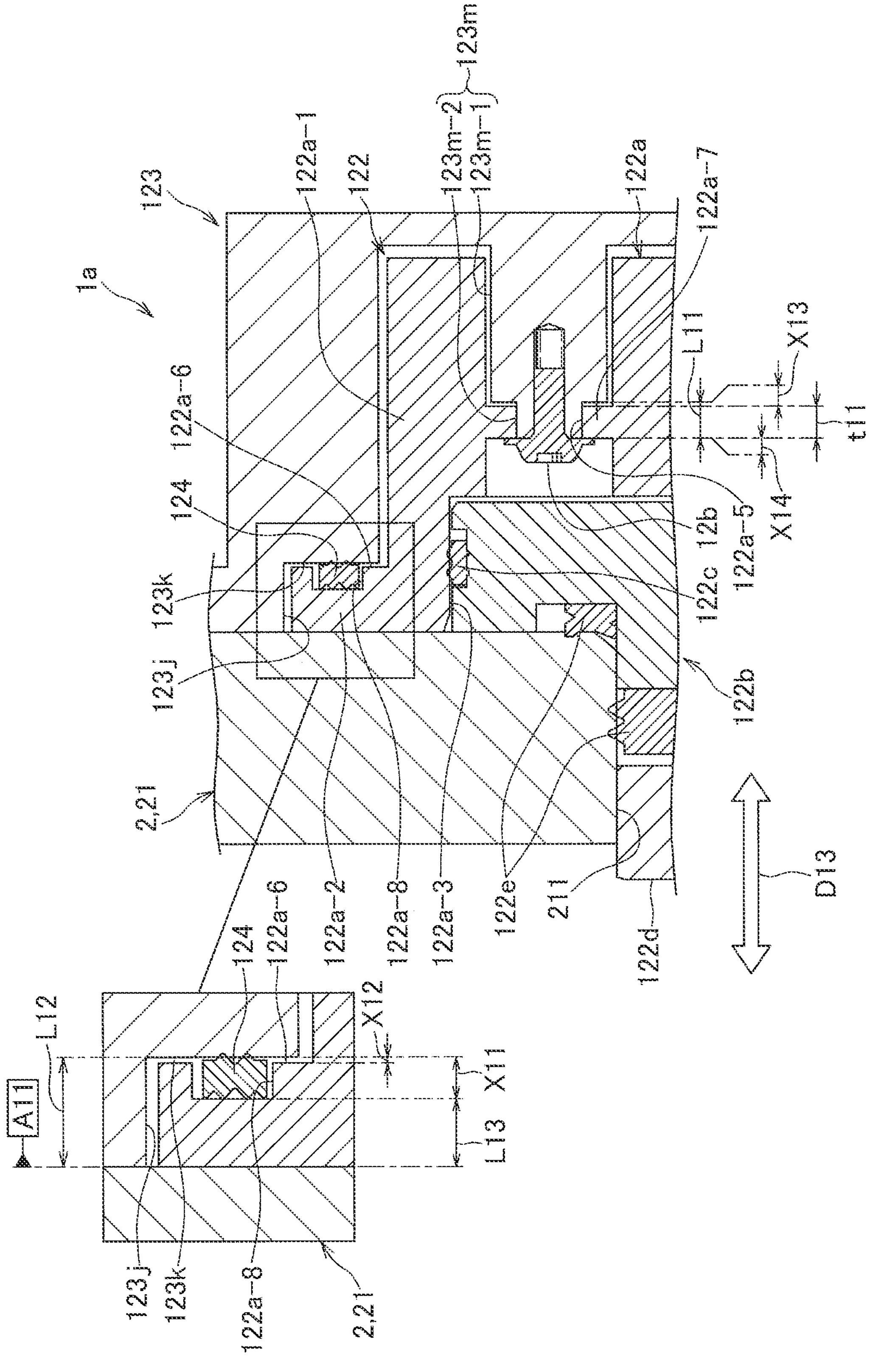
FIG. 6 is an enlarged cross-sectional view illustrating a seal portion achieved by a second seal member of the fixation structure as illustrated in FIG. 5, together with a peripheral portion thereof.

FIG. 5 is cross-sectional view, taken along line V11-V11 of FIG. 1, illustrating the fixation structure of the attachment housing and the shell with the second seal member interposed therebetween. FIG. 6 is an enlarged cross-sectional view illustrating the seal portion achieved by the second seal member of the fixation structure as illustrated in FIG. 5, together with a peripheral portion thereof.

FIG. 5 and FIG. 6 illustrate the fixation structure between the attachment housing 122 and the shell 123 with the second seal member 124 interposed therebetween, with the connection direction converting connector 1*a* being connected to the device 2, i.e., the connection target. In the cross-sectional view of FIG. 5 and FIG. 6, the attachment terminal 121 and the like, which are off the cross-section taken through one stepped boss 123*m* of the shell 123, are not illustrated. In this cross-sectional view, a portion of the device-side housing 122*b*, a portion of the fourth seal member 122*e*, and a portion of the front member 122*d* are illustrated as portions of the connection direction converting connector 1*a* that have entered the entry hole 211 of the case 21 of the device 2. As described above, the fourth seal member 122*e* located at the border between the device-side portion 122*b*-1 and the proximal-end portion 122*b*-2 of the device-side housing 122*b* is sandwiched between the border portion and the inner peripheral edge on the outer side of the entry hole 211 to seal therebetween. The third seal member 122*c* is provided between the outer periphery of the proximal-end portion 122*b*-2 and the inner periphery of the installation recessed portion 122*a*-3 of the shell-side housing 122*a* to seal therebetween. In the device 2, the terminal portion 22 is located at the tip of the front member 122*d*, and the attachment terminal 121 is connected to the terminal 221 of the terminal portion 22 (FIG. 1).

In this case, the second seal member 124 for sealing between the shell 123 and the attachment housing 122 is a frame-shaped seal member that seals between a housing-side opposing surface 122*a*-6 and a shell-side opposing surface 123*k* explained later. The housing-side opposing surface 122*a*-6 is a frame-shaped surface portion that surrounds the accommodation portion of the attachment housing 122 that contains the connection portion between the attachment terminal 121 and the connector terminal 112, and faces the shell 123. Specifically, the housing-side opposing surface 122*a*-6 is a surface of the rectangular plate portion 122*a*-2 of the shell-side housing 122*a* that extends to surround the rectangular block portion 122*a*-1, the surface being in a rectangular frame shape near the edge of the rectangular plate portion 122*a*-2. The shell-side opposing surface 123*k* is a frame-shaped surface portion that faces the housing-side opposing surface 122*a*-6, and specifically, the shell-side opposing surface 123*k* is a stepped surface in a rectangular frame shape at the border portion between the deep-bottom recessed portion 123*h* and the shallow-bottom recessed portion 123*j* of the shell 123.

The second seal member 124 pushes the attachment housing 122 from the opening 123*a* according to the clearance from the shell 123 in a stage prior to the fixation of the shell 123 to the case 21 of the device 2. When the shell 123 is fixed to press the pushed-out attachment housing 122 against the case 21 of the device 2, the second seal member 124 makes sealing by being crushed by the attachment housing 122 that is pushed back.

In this case, in the present embodiment, the clearance between the attachment housing 122 and the shell 123 is a gap that the attachment housing 122 could move in the axial direction D13 of the shell 123 in a bottomed rectangular tubular shape if it were not for the second seal member 124. The attachment housing 122 is fixed, with the above-described clearance, to the shell 123 with the bolt holes 122*a*-5 provides at four locations of the shell-side housing 122*a*, the four stepped bosses 123*m* of the shell 123 for receiving screws, and the four bolts 12*b*.

The stepped boss 123*m* includes: a first pillar portion 123*m*-1 erected from the inner bottom surface of the shell 123 to protrude in the axial direction D13; and a second pillar portion 123*m*-2 that further protrudes toward the opening 123*a* from the tip of the first pillar portion 123*m*-1 and that is thinner than the first pillar portion 123*m*-1. The second pillar portion 123*m*-2 of the stepped boss 123*m* penetrates the bolt hole 122*a*-5 of the shell-side housing 122*a*, and the bolt 12*b* is screwed from the tip of the second pillar portion 123*m*-2. In this case, a length L11 of the second pillar portion 123*m*-2 is greater than a thickness t11 of a portion of the outer wall 122*a*-7 of the shell-side housing 122*a* where the bolt hole 122*a*-5 is formed. For this reason, even when the bolt 12*b* is screwed into the stepped boss 123*m* the second pillar portion 123*m*-2 of which penetrates the bolt hole 122*a*-5 until the head of the bolt 12*b* comes into contact with the stepped boss 123*m*, the outer wall 122*a*-7 can slightly move in the axial direction D13 between the head of the bolt 12*b* and the stepped surface of the stepped boss 123*m*. The movable distance is a difference between the length L11 of the second pillar portion 123*m*-2 and the thickness t11 of the outer wall 122*a*-7, and this difference is the clearance between the attachment housing 122 and the shell 123. Specifically, the attachment housing 122 is fixed to the shell 123 with the bolt 12*b* screwed into the stepped boss 123*m*, such that the outer wall 122*a*-7 is sandwiched, with the above-described clearance, between the head of the bolt 12*b* and the stepped surface.

In the stage before the shell 123 is fixed to the case 21, the second seal member 124 pushes out the attachment housing 122 from the opening 123*a* of the shell 123 according to the above-described clearance until the outer wall 122*a*-7 around the bolt hole 122*a*-5 comes into contact with the head of the bolt 12*b*. When the shell 123 is fixed to the case 21 of the device 2, the second seal member 124 makes sealing by being crushed by the attachment housing 122 that is pushed back by the case 21 the amount of pushing before the fixation.

The housing-side opposing surface 122*a*-6 is formed with a seal groove 122*a*-8 in a frame shape in which the second seal member 124 in a frame shape fits in such a manner that a portion of the second seal member 124 protrudes toward the shell-side opposing surface 123*k* with the amount of protrusion according to the above-described clearance. When the attachment housing 122 is fixed to the shell 123, the protruding portion of the second seal member 124 protruding from the seal groove 122*a*-8 is pressed against and crushed by the shell-side opposing surface 123*k*. The attachment housing 122 is pushed out by the reaction force. In this case, the pushing out is performed, as described above, with the amount of pushing for causing the outer wall 122*a*-7 around the bolt hole 122*a*-5 to come into contact with the head of the bolt 12*b*. When the shell 123 is fixed to the case 21 of the device 2, the attachment housing 122 is pushed back by the case 21, and the outer wall 122*a*-7 around the bolt hole 122*a*-5 moves away from the head of the bolt 12*b* toward the stepped surface of the stepped boss 123*m*. As a result, the clearance between the attachment housing 122 and the shell 123 is divided into a stepped surface-side clearance X13 and a bolt-side clearance X14. In this case, the distance between a portion of the housing-side opposing surface 122*a*-6 other than the seal groove 122*a*-8 and the shell-side opposing surface 123*k* decreases. However, even when the shell 123 is completely fixed to the case 21, the portion of the housing-side opposing surface 122*a*-6 other than the seal groove 122*a*-8 and the shell-side opposing surface 123*k* are away from each other. In this case, a mutual distance X12 therebetween is smaller than the gap between the outer wall 122*a*-7 and the shell 123 in the above-described clearance, i.e., the above-described stepped surface-side clearance X13. A clearance indicated expressed as (stepped surface-side clearance X13)+(bolt-side clearance X14) is a gap that absorbs variation in manufacturing of each of the attachment housing 122 and the shell 123.

Here, the second seal member 124 being sufficiently crushed in the axial direction D13 with the shell 123 being fixed to the case 21 is one of the conditions for the second seal member 124 to achieve a sufficient seal performance. The amount of crush of the second seal member 124 in the fixed state is determined by a gap between the bottom of the seal groove 122*a*-8 and the shell-side opposing surface 123*k* in the fixed state (hereinafter referred to as a seal property design gap X11). In the present embodiment, the seal property design gap X11 is controlled by the following two sizes where a seating surface of the case 21 for the shell in the fixed state is referred to as a reference surface A11. Specifically, these are two sizes including: a depth L12 of the shallow-bottom recessed portion 123*j* that is the distance from the reference surface A11 to the shell-side opposing surface 123*k* in the fixed state; and a groove bottom thickness L13 that is the distance from the reference surface A11 to the bottom of the seal groove 122*a*-8 in the fixed state. The seal property design gap X11 is obtained as (the depth L12 of the shallow-bottom recessed portion 123*j*)−(groove bottom thickness L13).

According to the connection direction converting connector 1*a* and the wire harness 1 according to the embodiment explained above, the following effects can be achieved. Specifically, according to the present embodiment, the opening 123*a* of the shell 123 is fixed to the device 2, so that the body connector 11 is connected to the device 2 such that the connection direction is changed from the first connection direction D11 to the second connection direction D12. The connection portion between the connector terminal 112 and the attachment terminal 121, which is to be sealed from salt water and the like, is sealed by the second seal member 124 surrounding the accommodation portion of the attachment housing 122 for containing the connection portion. In this case, this second seal member 124 is sandwiched and arranged between the housing-side opposing surface 122*a*-6 of the attachment housing 122 and the shell-side opposing surface 123*k* of the shell 123. According to such an arrangement, even before the connection direction converting connector 1*a* is fixed to the device 2, the second seal member 124 is sandwiched between the housing-side opposing surface 122*a*-6 and the shell-side opposing surface 123*k* to be in a hidden state, and therefore, scratches are alleviated. In this manner, according to the above-described connection direction converting connector 1*a*, scratches of the second seal member 124 can be alleviated in a stage before the fixation.

In this case, according to the present embodiment, the attachment housing 122 is fixed to the shell 123 with a clearance. In the stage before the shell 123 is fixed to the device 2, the second seal member 124 pushes out the attachment housing 122 from the shell 123 according to the clearance. When the shell 123 is fixed to the device 2, the second seal member 124 makes sealing by being crushed by the attachment housing 122. According to this configuration, the second seal member 124 makes sealing by being crushed with the amount of crush according to the clearance. Therefore, the amount of crush of the second seal member 124, i.e., the seal performance for sealing salt water and the like, can be controlled according to a limited parameter, i.e., with how much clearance the attachment housing 122 is fixed to the shell 123. Since the parameters for controlling the seal performance are limited, it becomes easier to control the seal performance, and as a result, the seal performance can be improved. In the present embodiment, the seal property design gap X11 for determining the seal performance in association with the clearance can be derived as (the depth L12 of the shallow-bottom recessed portion 123*j*)−(groove bottom thickness L13).

Figure 7:
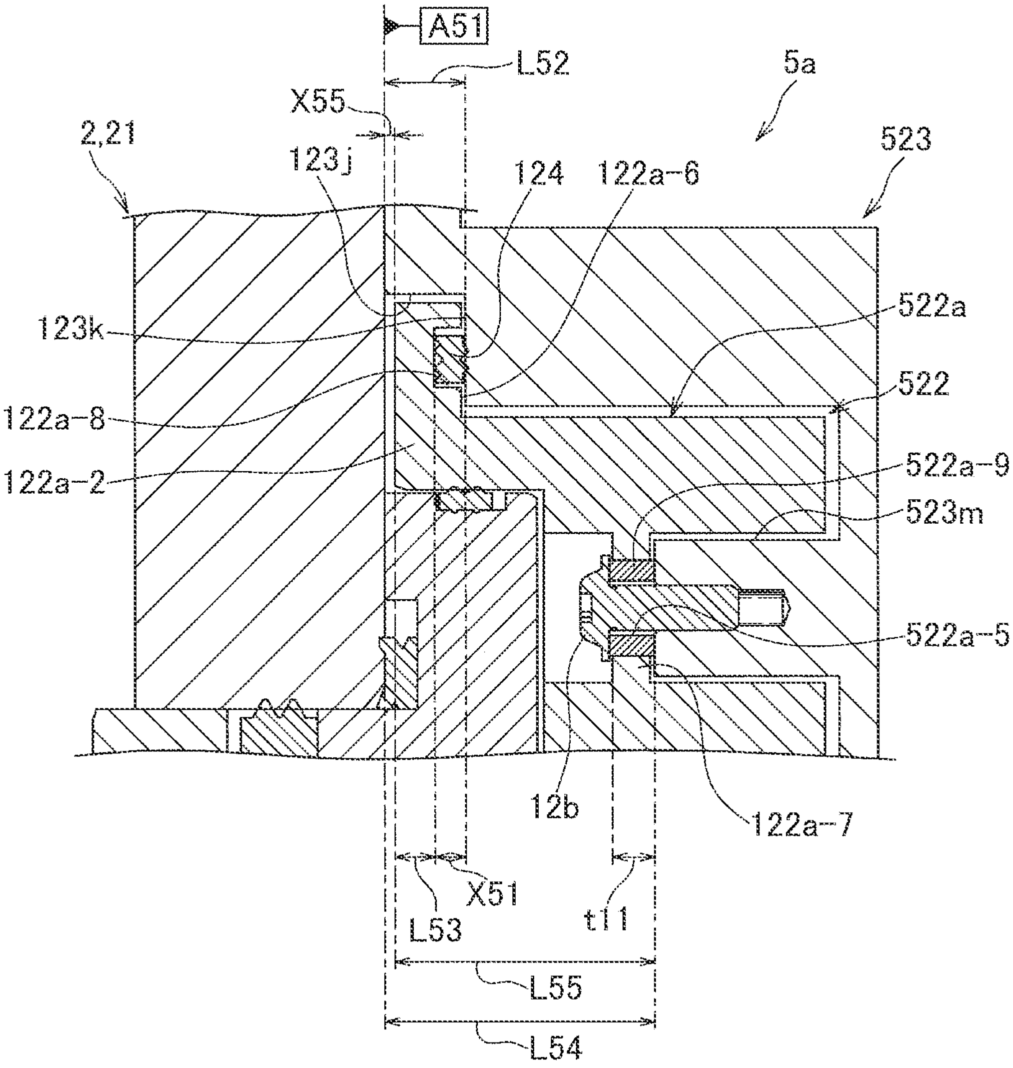
FIG. 7 illustrates, as a partial cross-sectional view equivalent to FIG. 6, a comparative example with respect to the connection direction converting connector according to the embodiment illustrated in FIG. 1 to FIG. 6.

FIG. 7 illustrates, as a partial cross-sectional view equivalent to FIG. 6, a comparative example with respect to the connection direction converting connector according to the embodiment illustrated in FIG. 1 to FIG. 6.

The connection direction converting connector 5*a* according to the comparative example illustrated in FIG. 7 has a configuration equivalent to the connection direction converting connector 1*a* according to the above-described embodiment except that the connection direction converting connector 5*a* is different in a fixation structure of an attachment housing 522 with a shell 523. Accordingly, in FIG. 7, among constituent elements equivalent to the constituent elements illustrated in FIG. 1 to FIG. 6, only constituent elements necessary for explanation are denoted with the same reference numerals as in FIG. 1 to FIG. 6. Hereinafter, redundant explanation about these equivalent constituent elements is omitted.

In the connection direction converting connector 5*a* according to the comparative example, a bolt hole 522*a*-5 of the attachment housing 522 is integrally formed with, by insert molding, a metal collar 522*a*-9 in a tubular shape that is longer than the thickness t11 of an outer wall 122*a*-7. The collar 522*a*-9 is insert molded in such a state that the opening portions on both ends slightly protrude from the outer wall 122*a*-7 of the attachment housing 522

A boss 523*m* in a simple pillar shape is erected at a position of the shell 523 corresponding to the bolt hole 522*a*-5. The collar 522*a*-9 protruding to the outer side of the outer wall 122*a*-7 fits in the shell 523 to be in contact with the tip of the boss 523*m*, and the attachment housing 522 is fastened to the boss 523*m* with a bolt 12*b* penetrating the collar 522*a*-9. In contrast to the above-described embodiment, in the connection direction converting connector 5*a* according to the comparative example, the attachment housing 522 is fixed to the shell 523 without any clearance. In this case, in order not to prevent fixation of the shell 523 to the case 21 of the device 2, a gap X55 is open between a rectangular plate portion 122*a*-2 of the shell-side housing 522*a* and the outer wall surface of the case 21. According to the comparative example, regardless of before and after the shell 523 is fixed to the device 2, the second seal member 124 seals between the housing-side opposing surface 122*a*-6 and the shell-side opposing surface 123*k* in an always crushed state with the amount of crush based on a seal property design gap X51 as below.

The seal property design gap X51 according to the comparative example is a value obtained by subtracting a distance between the outer wall surface of the case 21 of the device 2, i.e., the reference surface A51, and the bottom of the seal groove 122*a*-8 from a depth L52 of the shallow-bottom recessed portion 123*j* that is a distance between the reference surface A51 and the shell-side opposing surface 123*k*. In this case, the distance between the reference surface A51 and the bottom of the seal groove 122*a*-8 is a value obtained by adding the groove bottom thickness L53 of the seal groove 122*a*-8 to the above-described gap X55. The gap X55 is expressed by the following two sizes. One of the sizes is a distance from the reference surface A51 to the end surface of the boss 523*m*, i.e., an end depth L54 of the boss 523*m* in the shell 523. Another of the sizes is a collar end surface height L55 that is the distance from a contact surface of the rectangular plate portion 122*a*-2 for contact with the device 2 to an end surface of the collar 522*a*-9 protruding the outer surface-side of the shell-side housing 522*a*. The gap X55 is a value obtained by subtracting the collar end surface height L55 from the end depth L54 of the boss 523*m*. In other words, the seal property design gap X51 according to the comparative example is derived as (depth L52 of shallow-bottom recessed portion 123*j*)−{(the end depth L54 of the boss 523*m*)−(collar end surface height L55)+(groove bottom thickness L53)}.

Similar to the above-described embodiment, according to the comparative example explained above, the second seal member 124 is in a hidden state, and accordingly, scratches of the second seal member 124 can be alleviated in a stage before the fixation. On the other hand, according to the comparative example in which the attachment housing 522 does not have any clearance with respect to the shell 523, the seal property design gap X51 requires four parameters for its control as explained above, which makes it more difficult to improve the seal performance.

In contrast, according to the above-described embodiment, only two parameters are required to control the seal property design gap X11, which makes it easier to improve the seal performance.

Furthermore, in the present embodiment, the shell 123 is provided with the stepped bosses 123*m*. The attachment housing 122 is fixed to the shell 123 such that the outer wall 122*a*-7 is sandwiched with a clearance between the head of the bolt 12*b* and the stepped surface of the stepped boss 123*m*. According to this configuration, the above-described seal property design gap X11 can be precisely controlled by a difference between the length L11 of the second pillar portion 123*m*-2 of the stepped boss 123*m* and the thickness t11 of the outer wall 122*a*-7 of the attachment housing 122.

Furthermore, in the present embodiment, the frame-shaped seal groove 122*a*-8 in which the frame-shaped second seal member 124 fits is formed on the housing-side opposing surface 122*a*-6. According to this configuration, the second seal member 124 fits in the seal groove 122*a*-8, so that the position of the second seal member 124 is stabilized on the housing-side opposing surface 122*a*-6, and therefore, the seal performance can be further improved by the second seal member 124.

Furthermore, in the present embodiment, even when the shell 123 is fixed to the device 2, a portion of the housing-side opposing surface 122*a*-6 other than the seal groove 122*a*-8 and the shell-side opposing surface 123*k* are away by the mutual distance X12 as explained below. This mutual distance X12 is a distance smaller than the stepped surface-side clearance X13 that is the gap between the outer wall 122*a*-7 and the shell 123, the gap being a portion of the above-described clearance. According to this configuration, even in the fixed state, the portion of the housing-side opposing surface 122*a*-6 other than the seal groove 122*a*-8 and the shell-side opposing surface 123*k* are away from each other, and therefore, the second seal member 124 can be sufficiently crushed to effectively exhibit seal performance.

It should be noted that the embodiment explained above merely illustrates a typical form of a connection direction converting connector and a wire harness. The connection direction converting connector and the wire harness are not limited thereto and can be implemented with various modifications.

For example, in the above-described embodiment, the wire harness 1, which is provided in an automobile or the like, is illustrated as an example of a wire harness, but the wire harness is not limited thereto. The location where the wire harness 1 is provided is not particularly limited.

Furthermore, in the above-described embodiment, the connection direction converting connector 1*a* for connecting the body connector 11, which is a straight connector for two terminals, to the connection target upon changing its connection direction 90 degrees is illustrated as an example a connection direction converting connector. However, the connection direction converting connector is not limited thereto, and a specific angle of changing of the connection direction, a specific number of terminals, and the like are not particularly limited.

Furthermore, in the above-described embodiment, the attachment member 12 having a rectangular block-like appearance is illustrated as an example of an attachment member. However, the attachment member is not limited thereto, and its specific appearance shape and the like can be set to any shape.

Furthermore, in the above-described embodiment, the wire harness 1 including the electric wires 1*b* that are shielded electric wires is illustrated as an example of a wire harness. Furthermore, according to the connection direction converting connector 1*a* of the wire harness 1, the braids of the electric wires 1*b* are connected to the metal shell 123 via the shield terminals 113. However, the connection direction converting connector and the wire harness are not limited thereto, and the electric wires may be ordinary electric wires without the shield structure, and the body connector may be a connector without a shield terminal for grounding the braids.

Furthermore, in the above-described embodiment, the connection direction converting connector 1*a* in which the attachment housing 122 is fixed to the shell 123 with the clearance is illustrated as an example of a connection direction converting connector. However, the connection direction converting connector is not limited thereto, and for example, the attachment housing 522 may be fixed to the shell 523 without any clearance, as illustrated in the comparative example in FIG. 7. However, when clearance is given to the fixation of the attachment housing 122, the seal property design gap X11 for determining the seal performance can be determined by two parameters, which makes it easier to improve the seal performance, as explained above.

Furthermore, in the above-described embodiment, the connection direction converting connector 1*a* in which the outer wall 122*a*-7 of the attachment housing 122 is sandwiched, with the clearance, between the head of the bolt 12*b* and the stepped surface of the stepped boss 123*m* is illustrated as an example of a connection direction converting connector. However, the connection direction converting connector is not limited thereto, and, for example, the outer wall 122*a*-7 of the attachment housing 522 may be fixed, without a clearance, to the boss 523*m* without a step, as illustrated in the comparative example in FIG. 7. However, when the outer wall 122*a*-7 of the attachment housing 122 is fixed with the clearance via the stepped boss 123*m*, the above-described seal property design gap X11 can be precisely controlled, as explained above.

Furthermore, in the above-described embodiment, the connection direction converting connector 1*a* in which the frame-shaped seal groove 122*a*-8 is formed on the housing-side opposing surface 122*a*-6 is illustrated as an example of a connection direction converting connector. However, the connection direction converting connector is not limited thereto, and the housing-side opposing surface may be a flat surface, and a seal member may be sandwiched between the housing-side opposing surface and the shell-side opposing surface. However, when the seal groove 122*a*-8 is provided on the housing-side opposing surface 122*a*-6 and the second seal member 124 fits therein, the seal performance can be further improved as explained above.

Furthermore, in the above-described embodiment, the connection direction converting connector 1*a* in which the portion of the housing-side opposing surface 122*a*-6 other than the seal groove 122*a*-8 and the shell-side opposing surface 123*k* are away from each other even when the shell 123 is fixed is illustrated as an example of a connection direction converting connector. However, the connection direction converting connector is not limited thereto, and when the shell 123 is fixed, a portion of a housing-side opposing surface other than a seal groove and a shell-side opposing surface may be in close contact with each other. However, when the portion of the housing-side opposing surface 122*a*-6 other than the seal groove 122*a*-8 and the shell-side opposing surface 123*k* are away from each other when the shell 123 is fixed, the second seal member 124 can be sufficiently crushed to effectively exhibit seal performance, as explained above.

LIST OF REFERENCE SIGNS

1 wire harness
1*a*, 5*a* connection direction converting connector
1*b* wire
1*c*, 1*d*, 2*a*, 12*a*, 12*b* bolt
2 device (connection target)
11 body connector
12 attachment member
21 case
22 terminal portion
111 wire holding member
111*a* attachment flange
111*b* attachment hole
112 connector terminal
112*a*, 123*f*-1, 123*g*-1, 121*b*-1, 122*a*-5, 522*a*-5 bolt hole
113 shield terminal
114 first seal member
115 support member
121 attachment terminal
121*a* first portion
121*a*-1, 221*a* female screw hole
121*b* second portion
122, 522 attachment housing
122*a* shell-side housing
122*a*-1 rectangular block portion
122*a*-2 rectangular plate portion
122*a*-3 installation recessed portion
122*a*-4 terminal containing chamber
122*a*-6 housing-side opposing surface
122*a*-7 outer wall
122*a*-8 seal groove
122*b* device-side housing
122*b*-1 device-side portion
122*b*-2 proximal-end portion
122*b*-3 device insertion hole
122*b*-4, 122*b*-5 attachment groove
122*b*-6 holding step
122*c* third seal member
122*d* front member
122*d*-1 terminal window
122*e* fourth seal member
123, 523 shell
123*a* opening
123*b* surrounding wall
123*c* through hole
123*f* tongue piece
123*g* rib flange
123*h* deep-bottom recessed portion
123*j* shallow-bottom recessed portion
123*k* shell-side opposing surface
123*m* stepped boss
123*m*-1 first pillar portion
123*m*-2 second pillar portion
124 second seal member
211 entry hole
221 terminal
522*a*-9 collar
523*m* boss
A11, A51 reference surface
D11 first connection direction
D12 second connection direction
D13 axial direction t11 thickness of outer wall
L11 length of second pillar portion
L12, L52 depth of shallow-bottom recessed portion
L13, L53 groove bottom thickness
L54 end depth of boss
L55 collar end surface height
X11, X51 seal property design gap
X12 mutual distance
X13 stepped surface-side clearance
X14 bolt-side clearance
X55 gap

What is claimed is:

1. A connection direction converting connector comprising:

a body connector; and an attachment member to which the body connector is connected in a first connection direction, and to which a connection target is connected in a second connection direction that crosses the first connection direction, so that the attachment member relays connection of the body connector to the connection target, wherein the attachment member includes:

an attachment terminal formed in a bent shape including a first portion extending in the first connection direction and a second portion extending in the second connection direction, the first portion being connected to a connector terminal of the body connector, the second portion being connected to a terminal portion of the connection target;

an attachment housing containing a connection portion where the first portion and the connector terminal are connected to each other, and holding the attachment terminal such that the second portion protrudes;

a shell formed in a bottomed tubular shape, the shell containing, through an opening, at least an accommodation portion of the attachment housing for containing the connection portion so as to allow the second portion to be connected to the terminal portion, the body connector being connected to a surrounding wall of the shell, the connection target being fixed to a side of the shell formed with the opening; and a frame-shaped seal member configured to seal between: a frame-shaped housing-side opposing surface of the attachment housing that surrounds the accommodation portion and faces the shell; and a frame-shaped shell-side opposing surface of the shell that faces the housing-side opposing surface.

2. The connection direction converting connector according to claim 1, wherein the attachment housing is fixed, in an axial direction of the shell, to the shell with a predetermined clearance, and before the shell is fixed to the connection target, the seal member pushes the attachment housing from the opening according to the clearance, when the shell is fixed to the connection target in such a manner as to press the attachment housing against the connection target, the seal member makes sealing by being crushed by the attachment housing.

3. The connection direction converting connector according to claim 2, wherein the shell is provided with a stepped boss, for receiving a screw, protruding in the axial direction from an inner bottom surface of the shell, the stepped boss including: a first pillar portion erected on the inner bottom surface; and a second pillar portion further protruding from a tip of the first pillar portion toward the opening to penetrate an outer wall of the attachment housing, the second pillar portion being thinner than the first pillar portion, the second pillar portion being longer by the clearance than a thickness of the outer wall, the stepped boss having a stepped surface at a border between the first pillar portion and the second pillar portion, the attachment housing is fixed to the shell such that, with a bolt screwed into the stepped boss the second pillar portion of which penetrates the outer wall, the outer wall is sandwiched, with the clearance, between a head of the bolt and the stepped surface.

4. The connection direction converting connector according to claim 2, wherein the housing-side opposing surface is formed with a seal groove in a frame shape in which the seal member in a frame shape fits in such a manner that a portion of the seal member protrudes toward the shell-side opposing surface with an amount of protrusion according to the clearance.

5. The connection direction converting connector according to claim 4, wherein even when the shell is fixed to the connection target, a portion of the housing-side opposing surface other than the seal groove and the shell-side opposing surface are away by a mutual distance that is smaller than a gap between the outer wall and the shell, the gap being a portion of the clearance.

6. A wire harness comprising:

the connection direction converting connector according to claim 1; and an electric wire at an end of which the connector terminal is provided, the electric wire extending from the body connector.

7. A wire harness comprising:

the connection direction converting connector according to claim 2; and an electric wire at an end of which the connector terminal is provided, the electric wire extending from the body connector.

8. A wire harness comprising:

the connection direction converting connector according to claim 3; and an electric wire at an end of which the connector terminal is provided, the electric wire extending from the body connector.

9. A wire harness comprising:

the connection direction converting connector according to claim 4; and an electric wire at an end of which the connector terminal is provided, the electric wire extending from the body connector.

10. A wire harness comprising:

the connection direction converting connector according to claim 5; and an electric wire at an end of which the connector terminal is provided, the electric wire extending from the body connector.

* * * * *